US009686116B2

(12) United States Patent
Hurtta

(10) Patent No.: US 9,686,116 B2
(45) Date of Patent: Jun. 20, 2017

(54) DYNAMIC SERVICE INFORMATION FOR THE ACCESS NETWORK

(75) Inventor: Tuija Hurtta, Espoo (FI)

(73) Assignee: Nokia Technologies Oy, Espoo (FI)

( * ) Notice: Subject to any disclaimer, the term of this patent is extended or adjusted under 35 U.S.C. 154(b) by 820 days.

(21) Appl. No.: 12/871,736

(22) Filed: Aug. 30, 2010

(65) Prior Publication Data

US 2010/0329273 A1 Dec. 30, 2010

Related U.S. Application Data

(62) Division of application No. 10/953,367, filed on Sep. 30, 2004, now Pat. No. 7,916,700.

(30) Foreign Application Priority Data

Jun. 30, 2004 (EP) ..................... 04015321

(51) Int. Cl.
*H04L 29/06* (2006.01)
(52) U.S. Cl.
CPC .................... *H04L 29/06* (2013.01)
(58) Field of Classification Search
CPC ........................................................ H04L 29/06
USPC .................... 370/329, 336, 338; 455/450
See application file for complete search history.

(56) References Cited

U.S. PATENT DOCUMENTS

| 2002/0188562 | A1 | 12/2002 | Igarashi et al. | |
| 2003/0035401 | A1* | 2/2003 | Shaheen et al. | ............... 370/341 |
| 2004/0073928 | A1 | 4/2004 | Alakoski et al. | |
| 2004/0139012 | A1* | 7/2004 | Koskinen et al. | ............... 705/40 |
| 2007/0274522 | A1* | 11/2007 | Boman et al. | ................ 380/247 |

FOREIGN PATENT DOCUMENTS

| CN | 1411223 A | 4/2003 |
| WO | WO-2004/036825 | 4/2004 |
| WO | WO-2004034591 A2 | 4/2004 |

OTHER PUBLICATIONS

3GPP TS 29.207 V5.8.0, 3rd Generation Partnership Project; Technical Specification Group; Core Network; Policy control over Go interface (Release 5), Jun. 18, 2004,; <URL://www.3gpp.org/ftp/Specs/archive/29_series/29.207/29207-580.zip>.
GSM 3GPP Technical Specification Group Services and System Aspects; End-to-End Quality of Service (QoS) Concept and; Architecture V6.3.0 (Jun. 2004 (Release 6).
GSM 3GPP Technical Specification Group Services and System Aspects; Overall Architecture Aspects of IP Flow Based; Bearer Level Charging; Stage 2; V1.4.0 (Jan. 2004) (Release 6).
Huawei Technologies and China Mobile, An Functional Enhancement for PDF and GGSN; in E2E QoS, 3GPP TSG-SA WG2 Meeting #40, May 21, 2004, S2-042066,; <URL:http://webstats.2gpp.org/ftp/tsg_saNVG2_Arch/TSGS2_40_Sophia_Antipolis?Tdocs/; S2-042066.zip>.

(Continued)

*Primary Examiner* — Kan Yuen
*Assistant Examiner* — Richard Chang
(74) *Attorney, Agent, or Firm* — Mintz Levin Cohn Ferris Glovsky and Popeo, P.C.

(57) ABSTRACT

A method and an apparatus for providing an access network element in a communication network system with information are disclosed, the information enabling the access network element to perform service based processing on data belonging to an application session.

11 Claims, 5 Drawing Sheets

(56) References Cited

OTHER PUBLICATIONS

Office Action dated Jan. 18, 2010, issued by the Japanese Patent Office, issued in; connection with counterpart Japanese patent application No. 2007-518716.
Siemens, AF capabilities, 3GPP TSG-SA2 Meeting #39, Apr. 23, 2004, S2-041438,; <URL:http://www.3gpp.org/ftp/tsg_sa/VVG2_ArchTTSGS2_39_ShenzhenfTdocs/S2-041483.zip>.

* cited by examiner

DYNAMIC SERVICE INFORMATION FOR THE ACCESS NETWORK

CROSS REFERENCE TO RELATED APPLICATION

This application is a divisional application of U.S. patent application Ser. No. 10/953,367, filed on Sep. 30, 2004 now U.S. Pat. No. 7,916,700, entitled "Dynamic Service Information For The Access Network," which claims priority under 35 U.S.C. §119 to European Patent Application Serial No. 04015321.5 filed on Jun. 30, 2004, contents of all of the aforementioned applications are hereby incorporated by reference in their entirety.

FIELD OF THE INVENTION

The present invention relates to communication networks, and in particular to a service based control of access bearers and service flows (hereinafter also referred to as sessions) and an access network enforcing a result of the service based control.

BACKGROUND OF THE INVENTION

In 3GPP (Third Generation Partnership Project) network systems service based control such as charging control and QoS (Quality of Service) control is becoming standardized. For service based charging control, a Charging Rules Function (CRF) is introduced to the 3GPP reference architecture. For service based QoS control, a Policy Decision Function (PDF) is introduced to the 3GPP reference architecture.

Both the CRF and PDF interface with an Application Function (AF) to get application session and media component information to be used for rule creation, i.e. the CRF uses the application session and media component information for charging rule creation, and the PDF uses the application session and media component information for QoS rule creation. The AF sends information about the application session and media component(s) both to the CRF and PDF including e.g. information on a filter of a media component and a service in question (e.g. Application Id and/or Media Type).

Both the CRF and PDF interface with a Gateway (GW) to give rules to the GW which enforces the rules.

One key principle for enhancing the performance of a core network is to maximize the usage of service management and to minimize the usage of service control signaling. This means that as much as possible information is pre-configured in network elements and service control signaling is used only when absolutely necessary.

Rules (e.g. charging or QoS rules) pre-configured in the GW are used if possible, because this way, it is possible to decrease the amount of service control signaling traffic.

If the filter of an application session component is dynamic, the GW gets the filter from the AF through a service based control entity such as the CRF and PDF. With the filter, the GW can identify a service flow.

However, the GW is not able to apply pre-configured service specific rules in case of receiving dynamic information from the AF through the service based control entity.

SUMMARY OF THE INVENTION

It is an object of the present invention to enhance the usage of service management in a communication network.

According to the invention, this object is solved by a method and an apparatus for providing an access network element in a communication network system with information enabling the access network element to perform service based processing on data belonging to an application session.

Information on a service in question (e.g. an Application Id and/or a Media Type) is sent from a service based control entity such as a CRF or PDF to an access network, e.g. a Gateway (GW). The CRF and the PDF may get the information on the service in question from an Application Function (AF). This information may be provided by the AF for a media component or for the whole application session. In the latter case, it is assumed that if there are multiple media components within an application session, those are of the same service. The service based control entity may then provide this information to the GW for a service flow or for the whole access bearer (e.g. PDP context or WLAN tunnel). In the latter case, it is assumed that if there are multiple service flows within an access bearer, those are of the same service.

According to the invention, the GW is allowed to apply pre-configured service specific rules also in case of receiving dynamic information from the AF through the CRF and PDF.

Moreover, the service information may also be used in the GW when/if correlating information received from the CRF and PDF. If the GW receives information via two routes, the GW may want to check that there is no conflict in the information or may want to correlate that information for the implementation. The information received from the CRF may contain e.g. a filter, a charging rule instruction and service information. The information received from the PDF may contain e.g. a filter, a QoS rule instruction and service information. With the service information, the GW is enabled to correlate information received from the CRF and the PDF and to check that there is no conflict in the filters. If there is no conflict in the information received from the CRF and the PDF, the GW can optimize the storage of the information by storing the service information and the filter only once.

In the following, the invention will be described by way of preferred embodiments thereof taking into account the accompanying drawings.

DESCRIPTION OF THE PREFERRED EMBODIMENTS

Figure 1:
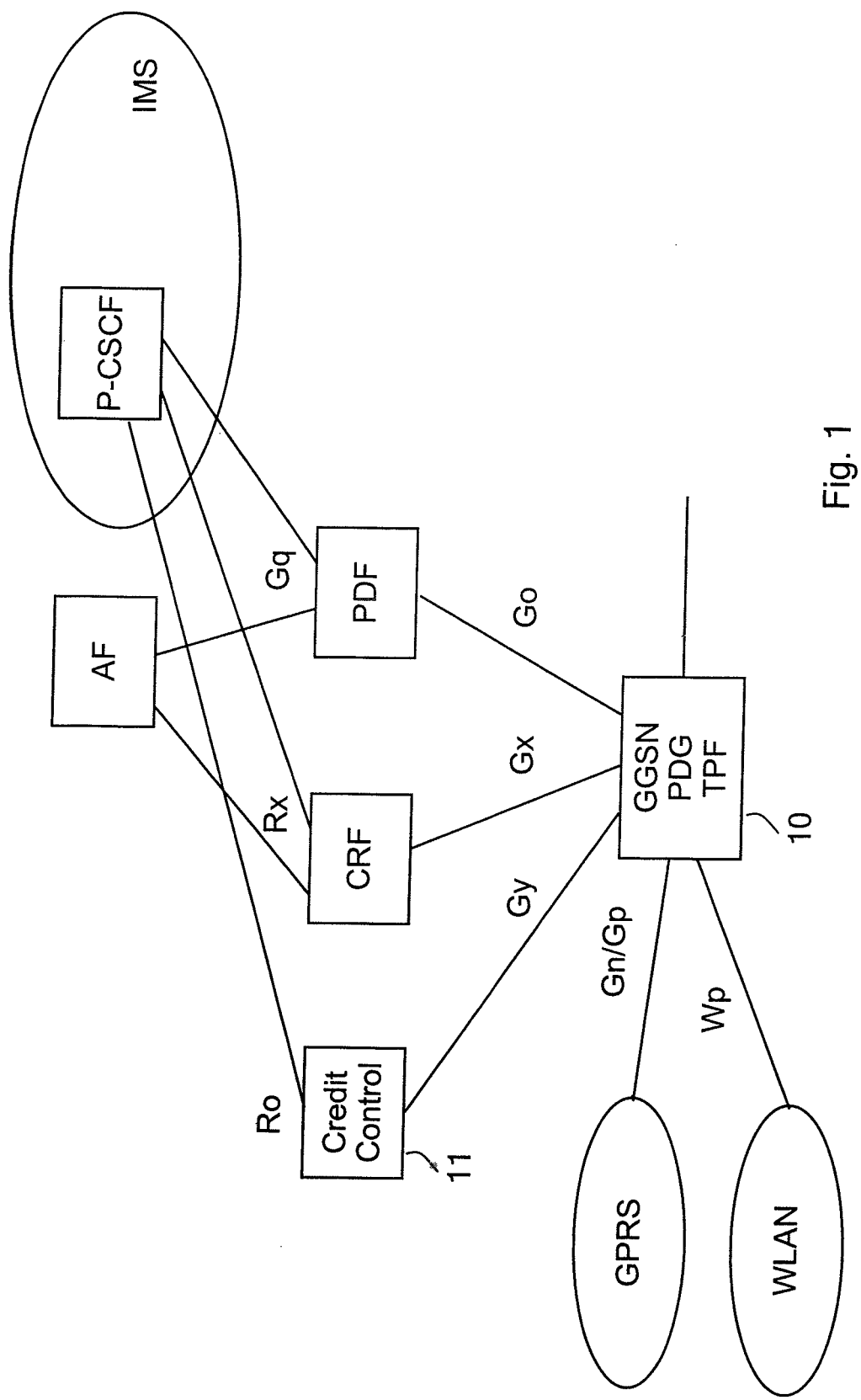
FIG. 1 shows a schematic block diagram illustrating a 3GPP reference architecture to which the invention is applicable.

FIG. 1 shows an architecture of a network system to which the invention is applicable. The network system comprises an access network including a gateway 10 such as a GGSN (Gateway GPRS Support Node) connected to a GPRS (General Packet Radio Services) access network, i.e. to an SGSN (Serving GPRS Support Node), via a Gn/Gp interface or a PDG (Packet Data Gateway) connected to a WLAN access network, i.e. to a WAG (WLAN Access Gateway), via a Wp interface. According to CDMA (Code Division Multiple Access), the gateway 10 is formed by a PDSN (Packet Data Serving Node). In FIG. 1, a TPF (Traffic Plane Function) is co-located with the GGSN/PDG for flow based charging. The network system further comprises service based control entities such as a CRF connected to the gateway 10 via a Gx interface, a PDF connected to the gateway 10 via a Go interface and a Credit Control block 11 connected to the gateway 10 via a Gy interface. An application function AF is connected to the CRF via a Rx interface, and to the PDF via a Gq interface. The Application Function (AF) is an element of the network system, which supports application session and media component based control of IP bearer resources when required. An IMS (IP Multimedia Subsystem) of the network system, which comprises a P-CSCF (Proxy Call Session Control Function) enables support for IP multimedia applications. The P-CSCF of the IMS may act as an AF. As shown in FIG. 1, the P-CSCF is connected to the Credit Control block 11 via an Ro interface, to the CRF via the Rx interface and to the PDF via the Gq interface.

Figure 2:
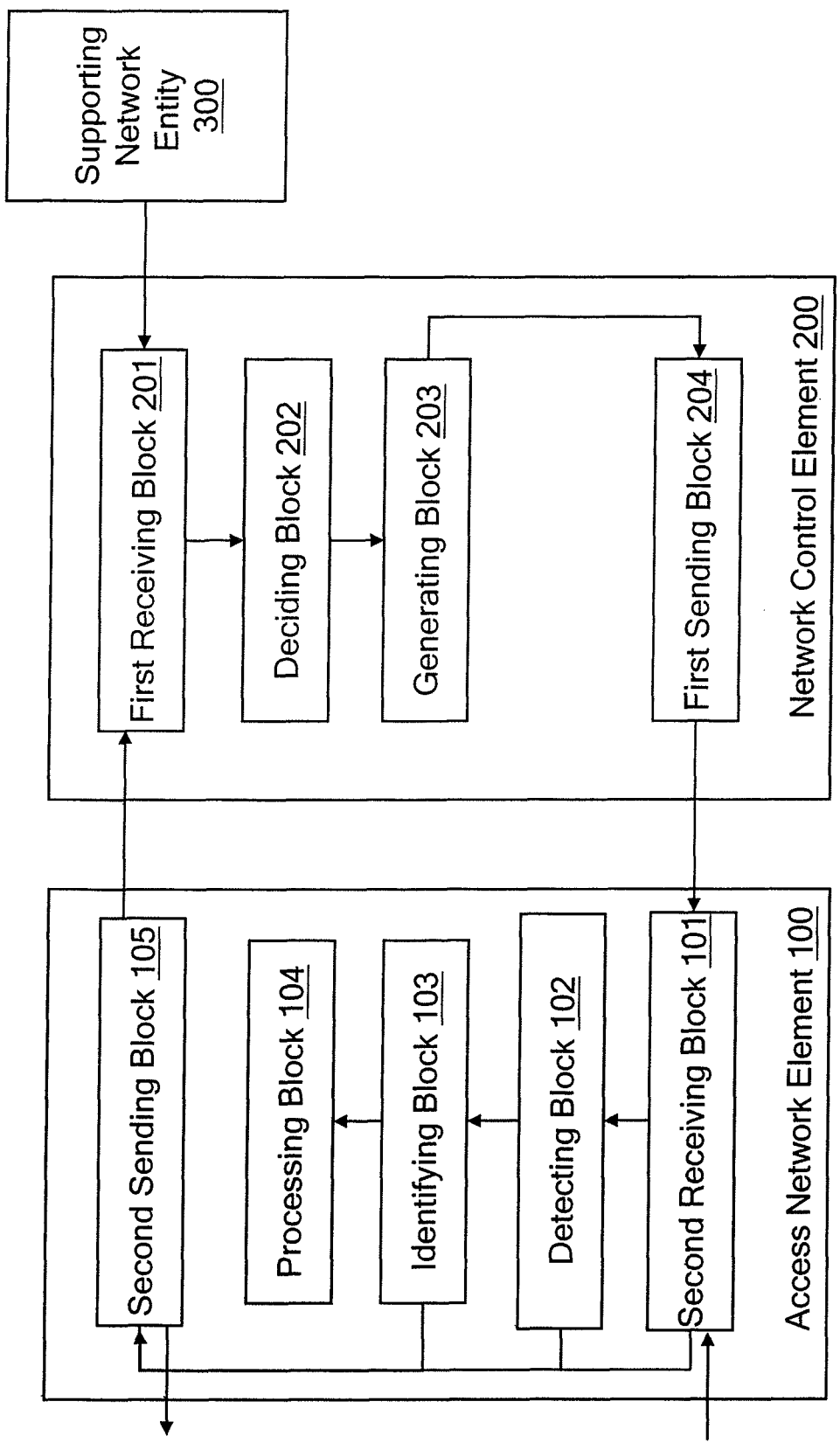
FIG. 2 shows a schematic block diagram illustrating an access network element and a network control element according to an embodiment of the invention.
Figure 3:
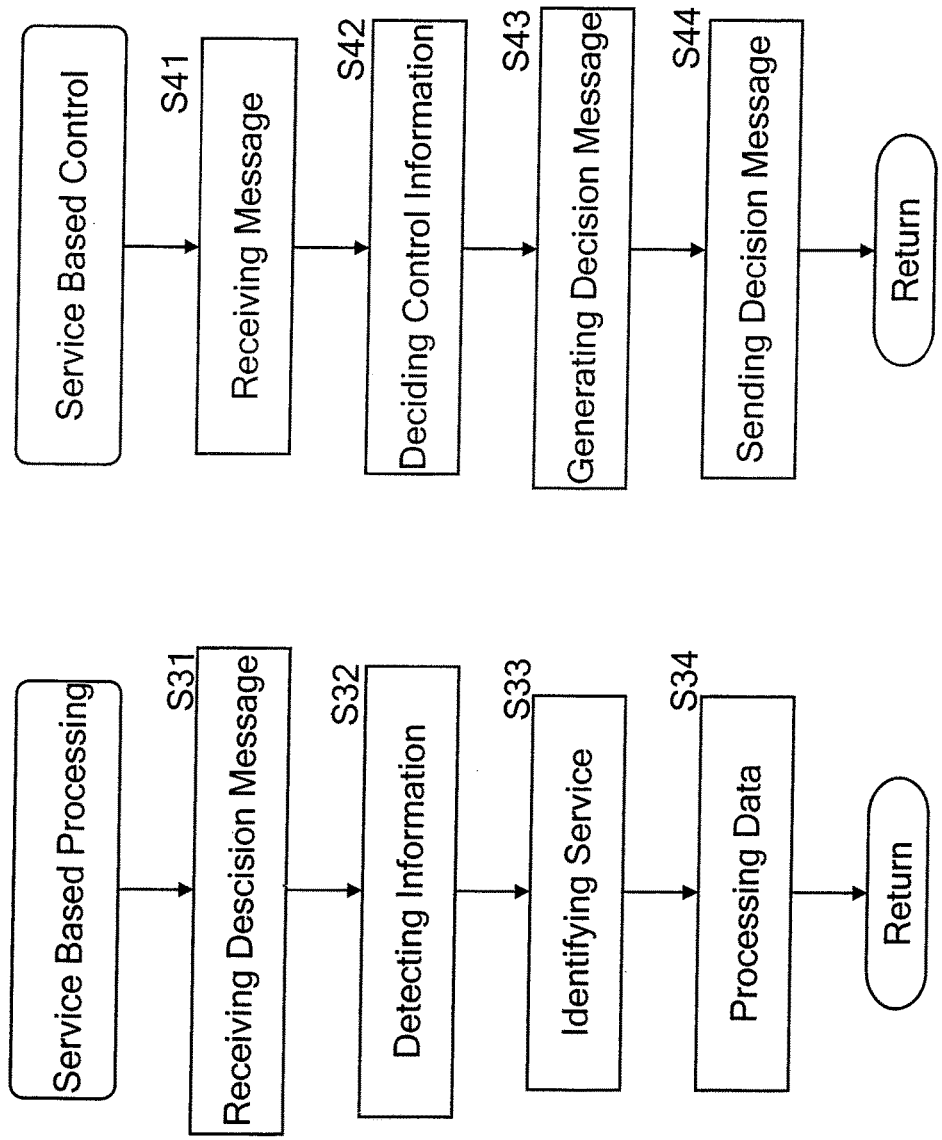
FIG. 3 shows flow charts illustrating procedures of a control method and a processing method according to the embodiment of the invention.

FIG. 2 illustrates an access network element 100 such as a gateway 10 shown in FIG. 1 and a network control element 200 such as a CRF or PDF shown in FIG. 1 according to an embodiment of the invention. FIG. 3 illustrates a service based control method and a service based processing method according to the embodiment of the invention. These methods may also be implemented as computer program products which may run on processors of the network control element 200 or the access network element 100. Moreover, it is to be noted that the blocks shown in FIG. 2 are for illustrating the concept of the invention and it is to be understood that the access network element 100 and the network control element 200 may have further means e.g. for acting as gateway and service based control entity, respectively. In addition, functions of different blocks shown in FIG. 2 may be combined to be performed in one block or functions of one block may be further separated into sub-blocks.

The network control element 200 is an element for performing service based control in a communication network system such as the system shown in FIG. 1. As shown in FIG. 2, the network control element 200 comprises a first receiving block 201, a deciding block 202, a generating block 203 and a first sending block 204. When a message from a supporting network entity 300 supporting an application session (e.g. from an Application Function or P-CSCF) is received by the first receiving block 201 (step S41 in FIG. 3), the deciding block 202 decides control information on the basis of the received message which comprises application session and/or media component information (step S42 in FIG. 3). The control information are decided for service flows/access bearers associated with the application session. The generating block 203 generates a decision message such that the decision message comprises the decided control information and information on a service in question (step S43 in FIG. 3), the decision message enabling the access network element 100 to perform service based processing on data belonging to the application session. The generating block 203 may generate the decision message such that the decision message further comprises an indication whether the information on the service in question is valid for the whole access bearer associated with the application session. Finally, the first sending block 204 sends the decision message to the access network element 100 (step S44 in FIG. 3). This may happen either when requested by the access network element 100 or without request from the access network element 100.

The access network element 100 is an element for processing and routing data belonging to an application session to a packet data network of the communication network system. As shown in FIG. 2, the access network element 100 comprises a second receiving block 101, a detecting block 102, an identifying block 103 and a processing block 104. When the second receiving block 101 receives a decision message from the network control element 200 (step S31 in FIG. 3), the detecting block 102 detects decided control information and information on a service in question from the decision message (step S32 in FIG. 3). The identifying block 103 identifies a service in question by using the information on a service in question (step S33 in FIG. 3). Thus, the processing block 104 is enabled to process data belonging to an application session in accordance with the identified service in question and the detected decided control information (step S34 in FIG. 3).

The control information may be stored in the access network element 100 in a storage unit (not shown). In this case, the processing block 104 of the access network element 100 can use the information on a service in question to access the control information and to select control information for the service. This may happen e.g. if sufficient control information is not received from the network control element 200.

The access network element 100 may further comprise a second sending block 105 which may send a request message to the network control element 200, requesting a decision message from the network control element 200. This request message may be sent in response to the receipt of a request for establishing or modifying an access bearer by the second receiving block 101. Alternatively or in addition, the request message may be sent in case the identifying block 103 identifies data belonging to a service flow. Moreover, a signaling message may be sent to a user equipment (not shown) after the detecting block 102 has detected decided control information and information on a service in question from the decision message.

The first receiving block 201 may receive updated application session and/or media components information. Thereupon, the deciding block 202 decides updated control information. In response thereto, the generating block 203 may generate an updated decision message and the first sending block 204 sends the updated decision message to the access network element 100. This may happen either when requested by the access network element 100 or without a request from the access network element 100.

For service based charging control, as network control element 200 the Charging Rules Function CRF may be introduced to the network system. For service based QoS control, as network control element 200 the Policy Decision Function PDF may be introduced to the network system.

Both the CRF and PDF interface with the Application Function (AF) to get application session and/or media component information to be used for rule creation (CRF for charging rule creation and PDF for QoS rule creation). The AF sends information about the application session and/or media component(s) both to the CRF and PDF including e.g. information on the filter of a media component and the service in question (e.g. Application Id or Media Type). Both the CRF and PDF interface with the gateway (GW) 10 acting as the access network element 100 to give rules to the GW 10.

According to the invention, information on the service in question (e.g. the Application Id) is sent from the service based control entities, i.e. the CRF and PDF, to the gateway 10 of the access network. The CRF and the PDF get this information from the AF. This information may be sent for each media component or for the whole application session. In the latter case, it is assumed that if there are multiple media components within an application session, those are of the same service. The CRF and the PDF may then provide this information to the GW for a service flow or for the whole access bearer (e.g. PDP context or WLAN tunnel). In the latter case, it is assumed that if there are multiple service flows within an access bearer, those are of the same service. As described above, the information may be sent by the service based control entities upon a request from the gateway 10 or independently thereof, e.g. if there are changes in application session and/or media component information.

Figure 4:
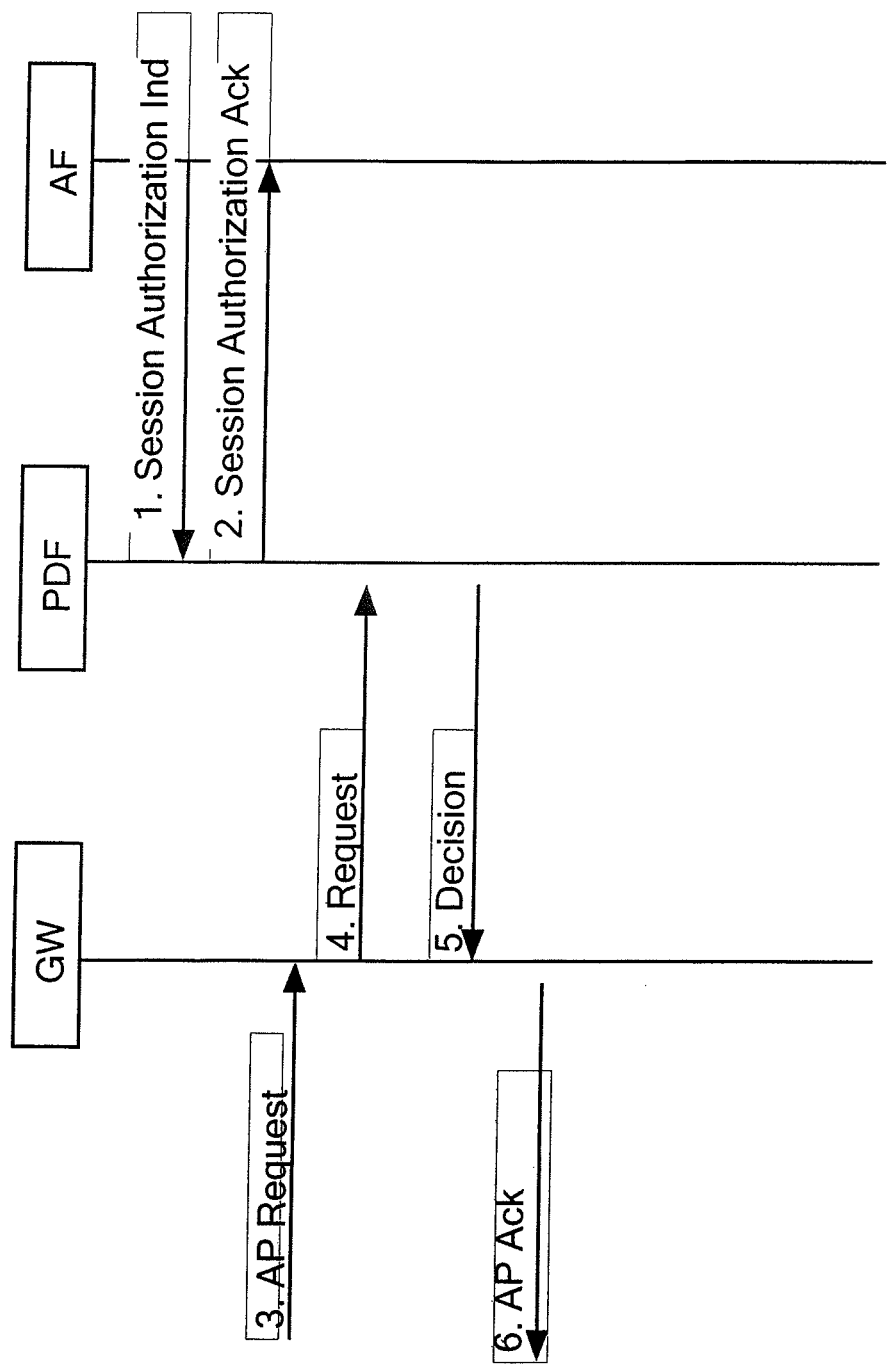
FIG. 4 shows a signaling diagram illustrating initial authorization and policy at an access bearer establishment with AF involved according to an implementation example of the invention.
Figure 5:
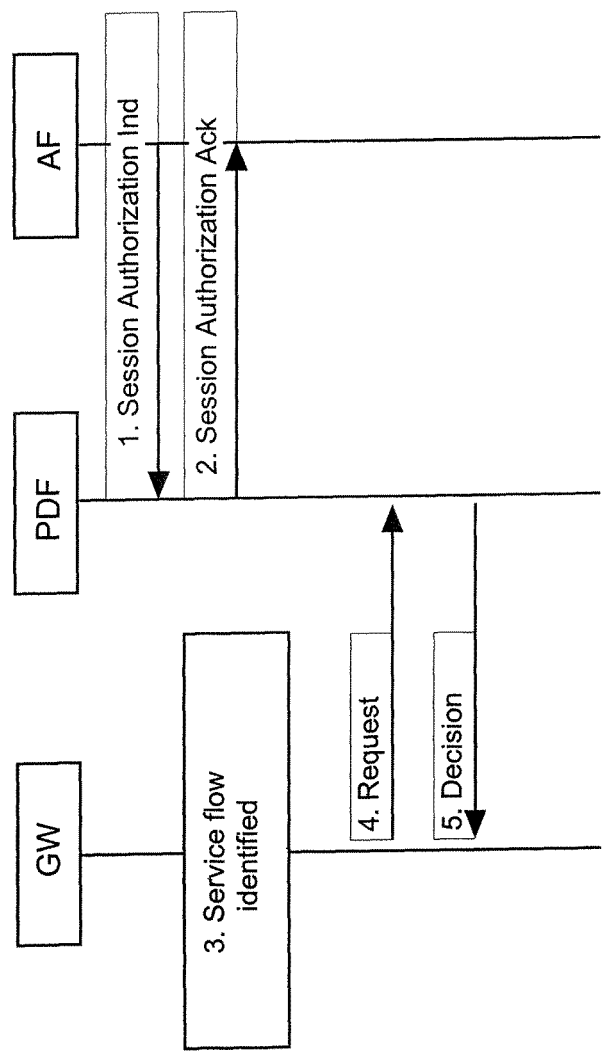
FIG. 5 shows a signaling diagram illustrating initial policy for a service flow with AF involved according to the implementation example of the invention.

FIGS. 4 and 5 show a provision of information on a service in question to a Gateway (GW) according to an implementation example of the invention. In FIGS. 4 and 5, communications with a PDF are illustrated, but similar communications may take place with a CRF or any service based control entity. As described above, the PDF and CRF are allowed to send decision messages to the GW without a request from the GW, e.g. if there are changes in application session and/or media component information.

FIG. 4 shows a signaling diagram illustrating an initial authorization and policy at an access bearer establishment.

When receiving a request for an access bearer establishment (e.g. in GPRS, a Create PDP (Packet Data Protocol) Context Request), the Gateway initiates an authorization and policy request to the PDF.

In communication 1 in FIG. 4, an Application Function (AF) sends a Session Authorization Indication (Application/Service Information, Authorization Token Request) message to the PDF. This message may be triggered by an application session establishment event in the AF (e.g. the AF receiving an AF session signaling message containing session description information (e.g. SDP)). The Application/Service Information includes for each media component an application id, packet filter information, direction information, QoS information and application specific information. The Authorization Token Request is included if the AF wants the PDF to allocate an authorization token.

The AF may send information on multiple application sessions to the PDF. It is also possible that multiple AFs send information on the application sessions to the PDF.

Upon receiving the message from the AF, the PDF allocates an authorization token if requested by the AF and replies by sending a Session Authorization Acknowledgment (Authorization Token) message to the AF (communication 2 of FIG. 4). The Authorization Token then is sent from the AF to a User Equipment (UE) initiating the session establishment (e.g. in case of IMS (Internet Protocol Multimedia Subsystem) and PSS (Packet Switched Streaming Service).

In communication 3 of FIG. 4, the Gateway receives a request for an access bearer establishment, i.e. an AP Request (Authorization Token, Flow Ids) message. The AP Request is a request to a specific access point of the GW. The Authorization Token and Flow Ids are available if sent by the UE with the AP Request message. Multiple sets of Authorization Token+Flow Ids may also be available.

Upon receiving the AP Request message, the Gateway resolves a PDF address by using the Authorization Token or by using PDF address information stored in the Gateway. The Gateway sends a Request (Authorization Token, Flow Ids) message to the PDF (communication 4 in FIG. 4). The Authorization Token+Flow Ids are included if received in communication 3. Multiple sets of Authorization Token+Flow Ids may also be included.

Upon receiving the request from the Gateway, the PDF uses the Authorization Token and Flow Ids to access the information sent by the AF in communication 1. The PDF performs an authorization and policy decision and sends a Decision (Access Bearer QoS Rule, Access Bearer Application Id, Service Flow Filter, Service Flow QoS Rule, Service Flow Application Id) message to the Gateway (communication 5 of FIG. 4). The Access Bearer QoS Rule indicates max values for a QoS class and bit rates of the access bearer. The Access Bearer Application Id may be included if all the service flows within the access bearer are of the same service. For each service flow, the Service Flow Filter is used in the GW to identify the service flow. For each service flow, the Service Flow QoS Rule indicates max values for the QoS class and bitrates of the service flow. For each service flow, the Service Flow Application Id indicates the service in question.

Upon receiving the Decision message, the Gateway enforces the authorization and policy decision. Finally, in communication 6 of FIG. 4, the Gateway acknowledges the access bearer establishment.

The signaling diagram of FIG. 4 may also be applied to access bearer modification.

FIG. 5 shows a signaling diagram illustrating an initial policy for a service flow. In case of IP multimedia services over GPRS (General Packet Radio System) it is possible to know beforehand which service flows will be carried on the access bearer, because 3GPP has specified that a UE has to indicate the service flows to the Gateway at an access bearer establishment/modification by sending the Authorization Token and Flow Ids. However, this does not apply to all access networks and to all application sessions. In some access networks, it may not be possible to send the Authorization Token and Flow Ids from the UE to the Gateway at the access bearer establishment/modification. And in case of legacy elements, AFs or UEs, the legacy elements may not support the usage of the Authorization Token and Flow Ids as binding information. For example in these cases, the Gateway initiates an initial policy request when identifying a service flow.

In communication 1 of FIG. 5 an AF sends a Session Authorization Indication (Application/Service Information, Authorization Token Request) message to a PDF. This message may be triggered by an application session establishment event in the AF. The Application/Service Information includes for each media component an application id, packet filter information, direction information, QoS information and application specific information. The Authorization Token Request is included if the AF wants the PDF to allocate an authorization token. The AF may send information on multiple application sessions to the PDF. However, it is also possible that multiple AFs send information on the application sessions to the PDF.

Upon receiving the message, the PDF allocates an authorization token if requested by the AF and replies by sending a Session Authorization Acknowledgment (Authorization Token) message to the AF (communication 2 of FIG. 5). After receiving the acknowledgment message, the AF may forward the Authorization Token to a UE initiating the session establishment (at least in case of IMS and PSS).

In block 3 of FIG. 5 a Gateway identifies a service flow for which PDF control is required. The Gateway resolves a PDF address by using PDF address information stored in the Gateway. The Gateway sends a Request (Service Flow Filter) message to the PDF (communication 4 of FIG. 5). The Service Flow Filter is derived from a received packet of the identified service flow.

Upon receiving the Request message from the Gateway, the PDF uses the Service Flow Classifier to access the information sent by the AF in communication 1. The PDF performs a policy decision and sends a Decision (Access Bearer QoS Rule, Access Bearer Application Id, Service Flow Filter, Service Flow QoS Rule, Service Flow Application Id) message to the Gateway (communication 5 of FIG. 5). The Access Bearer QoS Rule is included if there is a need to change the previous QoS rule of the access bearer. The Access Bearer Application Id may be included if all the service flows within the access bearer are of the same service. The Service Flow Filter is used in the GW to identify the service flow. The Service Flow QoS Rule indicates max values for the QoS class and bitrates of the service flow. The Service Flow Application Id indicates the service in question.

Finally, after receiving the Decision message from the PDF, the Gateway enforces the policy decision.

In the foregoing, a method and an apparatus for providing an access network element in a communication network system with information are disclosed, the information enabling the access network element to perform service based processing on data belonging to an application session.

It is to be understood that the above description is illustrative of the invention and is not to be construed as limiting the invention. Various modifications and applications may occur to those skilled in the art without departing from the true spirit and scope of the invention as defined by the appended claims.

The invention claimed is:

1. An apparatus comprising:
   at least one processor; and
   at least one memory including computer program code, the at least one processor, the at least one memory, and the computer program code configured to cause the apparatus to at least:
   send, to a network control element comprising a policy and/or charging rules function, a request for information relating to an application session;
   receive, from the network control element and in response to the request, a decision message comprising control information for charging rules and/or quality of service rules, the decision message further comprising information indicating one or more service identifiers for at least one service flow;
   identify the at least one service flow based on the one or more service identifiers; and
   process data belonging to the application session in accordance with the at least one service flow to enforce the charging rules and/or quality of service rules.

2. The apparatus according to claim 1, further configured to at least:
   receive a request for establishing or modifying an access bearer,
   wherein the request for information relating to the application session is sent in response to receiving the request for establishing or modifying the access bearer.

3. The apparatus according to claim 1, further configured to at least:
   identify data belonging to a service flow,
   wherein the request for information relating to the application session is sent in response to identification of the data belonging to the service flow.

4. The apparatus according to claim 1, further configured to at least:
   store the control information.

5. The apparatus according to claim 1, wherein the apparatus comprises and/or is comprised in a gateway general packet radio services support node of a general packet radio services access network or a packet data gateway of a wireless local area network.

6. The apparatus according to claim 1, wherein the policy and/or charging rules function interfaces with an application function for application session and/or media component information for the control information.

7. The apparatus according to claim 1, wherein the apparatus forms at least a portion of a core network, and wherein the apparatus is separate from a proxy call session control function element of an internet protocol multimedia subsystem separate from the core network.

8. A method comprising:
   sending, by an access network element comprising a gateway and to a network control element comprising a policy and/or charging rules function, a request for information relating to an application session;
   receiving, by the access network element and from the network control element in response to the request, a decision message comprising control information for charging rules and/or quality of service rules, the decision message further comprising information indicating one or more service identifiers for at least one service flow;
   identifying, by the access network element, the at least one service flow based on the one or more service identifiers; and
   processing, by the access network element, data belonging to the application session in accordance with the at least one service flow to enforce the charging rules and/or quality of service rules.

9. The method according to claim 8, further comprising:
   wherein
   storing, by the access network element, preconfigured control information; wherein accessing, based on the one or more service identifiers, the stored preconfigured control information when no or insufficient control information is received from the network control element; and
   selecting service specific control information from the stored preconfigured control information.

10. A non-transitory computer-readable medium encoded with instructions that, when executed by at least one processor, perform at least the following:
    sending, by an access network element comprising a gateway and to a network control element comprising a policy and/or charging rules function, a request for information relating to an application session;
    receiving, by the access network element and from the network control element in response to the request, a decision message comprising control information for charging rules and/or quality of service rules, the decision message further comprising information indicating one or more service identifiers for at least one service flow;

identifying, by the access network element, the at least one service flow based on the one or more service identifiers; and processing, by the access network element, data belonging to the application session in accordance with the at least one service flow to enforce the charging rules and/or quality of service rules.

11. The non-transitory computer-readable medium according to claim 10, wherein the non-transitory computer-readable medium is directly loadable into an internal memory of a computer.

\* \* \* \* \*